(12) United States Patent
Matzdorf et al.

(10) Patent No.: US 6,527,841 B2
(45) Date of Patent: Mar. 4, 2003

(54) POST-TREATMENT FOR METAL COATED SUBSTRATES

(75) Inventors: Craig A. Matzdorf, California, MD (US); Michael J. Kane, Callaway, MD (US); James L. Green, III, Lusby, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/012,981

(22) Filed: Nov. 6, 2001

(65) Prior Publication Data

US 2002/0053301 A1 May 9, 2002

Related U.S. Application Data

(63) Continuation-in-part of application No. 09/702,225, filed on Oct. 31, 2000, now Pat. No. 6,375,726.

(51) Int. Cl.[7] ............................................... C23C 22/05
(52) U.S. Cl. ............................ 106/14.44; 106/14.21; 106/14.41; 148/247
(58) Field of Search ..................... 106/14.44, 14.21, 106/14.41; 148/247

(56) References Cited

U.S. PATENT DOCUMENTS

| 3,539,403 | A | * | 11/1970 | Ries | 148/247 |
|---|---|---|---|---|---|
| 3,912,548 | A | * | 10/1975 | Faigen | 148/247 |
| 3,986,970 | A | * | 10/1976 | Shiga | 216/107 |
| 4,148,670 | A | * | 4/1979 | Kelly | 148/247 |
| 4,273,592 | A | * | 6/1981 | Kelly | 148/247 |
| 4,339,310 | A | * | 7/1982 | Oda et al. | 106/14.12 |
| 4,921,552 | A | * | 5/1990 | Sander et al. | 148/247 |
| 4,963,198 | A | * | 10/1990 | Higgins | 148/267 |
| 5,091,023 | A | * | 2/1992 | Saeki et al. | 106/14.12 |
| 5,226,976 | A | * | 7/1993 | Carlson et al. | 106/14.15 |
| 5,304,257 | A | * | 4/1994 | Pearlstein et al. | 148/265 |
| 5,395,655 | A | * | 3/1995 | Oyama Kazuyuki et al. | 148/251 |
| 6,375,726 | B1 | * | 4/2002 | Matzdorf | 106/14.21 |

\* cited by examiner

Primary Examiner—Anthony J. Green
(74) Attorney, Agent, or Firm—Ron Billi

(57) ABSTRACT

An aqueous composition for post-treating metal coated substrates such as cadmium-plated steel or zinc-nickel coated substrates and the process for using said composition to improve the corrosion-resistance, abrasion, and adhesion bonding properties of the metal coatings. The composition comprising an acidic aqueous solution having a pH ranging from about 2.5 to 4.5 containing effective amounts of trivalent chromium salts, an alkali metal hexafluorozirconate, at least one alkali metal fluorocompound, and effective amounts of water soluble thickeners and/or surfactants.

22 Claims, 9 Drawing Sheets

CADMIUM PLATED 4130 STEEL WITH
TCP POST TREATMENT – AS TREATED

CADMIUM PLATED 4130 STEEL WITH
CHROMATE POST TREATMENT – AS TREATED

CADMIUM PLATED 4130 STEEL WITHOUT A POST TREATMENT — AS PLATED

CADMIUM PLATED 4130 STEEL WITH TCP POST TREATMENT — AFTER 1000 HOUR EXPOSURE TO ASTM B117 NEUTRAL SALT FOG

CADMIUM PLATED 4130 STEEL
WITH CHROMATE POST TREATMENT –
AFTER 1000 HOUR EXPOSURE TO
ASTM B117 NEUTRAL SALT FOG

CADMIUM PLATED 4130 STEEL WITHOUT
A POST TREATMENT – AS PLATED,
AFTER 72 HOURS EXPOSURE TO
ASTM B117 NEUTRAL FOG

BASIC ZINC-NICKEL PLATED 4130 STEEL WITH TCP POST TREATMENT— AS TREATED

ACID ZINC-NICKEL PLATED 4130 STEEL WITH TCP POST TREATMENT— AS TREATED

BASIC ZINC-NICKEL PLATED 4130 STEEL WITH CHROMATE POST TREATMENT - AS TREATED

ACID ZINC-NICKEL PLATED 4130 STEEL WITH CHROMATE POST TREATMENT - AS TREATED

BASIC ZINC-NICKEL PLATED 4130 STEEL WITH TCP POST TREATMENT— AFTER 1000 HOUR EXPOSURE TO ASTM B117 NEUTRAL SALT FOG

ACID ZINC-NICKEL PLATED 4130 STEEL WITH TCP POST TREATMENT— AFTER 1000 HOUR EXPOSURE TO ASTM B117 NEUTRAL SALT FOG

BASIC ZINC-NICKEL PLATED 4130 STEEL
WITH CHROMATE POST TREATMENT—
AFTER 1000 HOUR EXPOSURE TO
ASTM B117 NEUTRAL SALT FOG

ACID ZINC-NICKEL PLATED 4130
WITH CHROMATE POST TREATMENT—
AFTER 1000 HOUR EXPOSURE TO
ASTM B117 NEUTRAL SALT FOG

ZINC-NICKEL COATING WITH
NO POST TREATMENT

ZINC-NICKEL COATING WITH
TCP POST TREATMENT

ZINC-NICKEL COATING WITH NO POST TREATMENT, AFTER 24 HOURS IN ASTM B117 NEUTRAL SALT FOG

ZINC-NICKEL COATING WITH TCP POST TREATMENT, AFTER 24 HOURS IN ASTM B117 NEUTRAL SALT FOG

POST-TREATMENT FOR METAL COATED SUBSTRATES

CONTINUATION APPLICATION

This application is a continuation-in-part of application Ser. No. 09/702,225 filed Oct. 31, 2000 by Matzdorf et al., now U.S. Pat. No. 6,375,726 B1 issued Apr. 23, 2002.

The invention described herein was made by an employee of the United States Government and may be manufactured and used by or for the Government for governmental purposes without the payment of any royalties thereon or therefor.

BACKGROUND OF THE INVENTION

1. Field of the Invention

This invention relates to a process of post-treating metal coated substrates, and to the composition for treating metal coated substrates to improve the adhesion-bonding, abrasion, and corrosion-resistant properties of the coated substrates. More specifically, this invention relates to a novel composition, and to the process of using the composition to post-treat metal coated substrates. The composition comprises an acidic aqueous solution comprising effective amounts of at least one water-soluble trivalent chromium salt, an alkali metal hexafluorozirconate, at least one tetrafluoroborate and/or hexafluorosilicate and effective amounts of water-soluble thickeners and/or water-soluble surfactants.

2. Description of Prior Art

Current high-performance post treatments for metal coated substrates are based on hexavalent chromium chemistry. Hexavalent chromium is highly toxic and a known carcinogen. As a result, the solutions used to deposit post-treatment coatings and the coating, per se are toxic. These coatings do, however, yield outstanding paint adhesion and corrosion resistance to the base metal. Typically, post-treatments or seal coatings are deposited onto the metal coating at about elevated temperatures and usually applied by immersion or spray processes. Post treatments are usually specified by the military or commercial specifications that govern each metal coating being treated. As such, there is not a unique "post treatment" specification for all metal coatings as there is for "conversion coated" aluminums.

Further, environmental laws, executive orders, and local occupational, safety, and health (OSH) regulations are driving military and commercial users in the search for chromate-free post treatments. In the case of coated metals, the metal substrates and the coatings per se are relatively non-toxic. With the addition of a chromate post treatment, however, these coatings become toxic. In addition, the use of chromate post treatments is becoming more expensive as regulations tighten. Costs are becoming prohibitive with future restrictions imposed by the EPA. Moreover, certain processes like spraying chromate coating solutions are forbidden at some facilities due to OSH risk, thereby forcing the use of less-than-optimum solutions. Thus, while existing chromate post treatments are outstanding in their technical performance in that they provide enhanced corrosion protection and adhesion bonding e.g. paint and other coating at a low application cost, from a life-cycle cost, environmental, and OSH perspective, chromate coatings are detrimental for people and the environment.

SUMMARY OF THE INVENTION

This invention relates to trivalent chromium post treatment (TCP) compositions and to the processes for improving the adhesion and corrosion resistant properties of metal coated substrates. These coatings and processes are generally known as "post-treatments". Post-treatments are coatings in contact with the metal being treated after formation of the initial coating and therefore the post-treatments normally have no direct contact with the underlying substrate, except possibly through some pores in the metal coating.

More specifically, this invention relates to a composition and to the process of using said composition to post-treat metal coated substrates at ambient temperatures or higher e.g. temperatures ranging up to about 200° F. Specifically, this invention relates to a composition for post-treating metal coatings to improve the corrosion-resistance and adhesion bonding properties thereof e.g. paint adhesion etc. The composition comprises an acidic aqueous solution having a pH ranging from about 2.5 to 4.5 and preferably 3.7 to 4.0, and comprises, per liter of said solution, from about 0.01 to 22 grams of a water-soluble trivalent chromium salt, about 0.01 to 12 grams of an alkali metal hexafluorozirconate, about 0.01 to 12 grams of at least one fluoro-compound selected from the group consisting of an alkali metal tetrafluoroborate, an alkali metal hexafluorosilicate and various combinations thereof, from about 0 to 10 grams per liter and preferably 0 to 2.0 grams of at least one water-soluble thickener, and from 0 to 10 grams per liter and preferably 0 to 2.0 grams of at least one water-soluble non-ionic, cationic or anionic surfactant.

It is therefore an object of this invention to provide an aqueous solution comprising a trivalent chromium salt, an alkali metal hexafluorozirconate, and effective amounts of a tetrafluoroborate and/or hexafluorosilicate for post-treating metal coated substrates to improve adhesion bonding and the corrosion resistance properties thereof It is another object of this invention to provide a stable acidic aqueous solution having a pH ranging from about 2.5 to 4.5 containing a trivalent chromium salt for treating metal coatings.

It is a further object of this invention to provide a stable acidic aqueous solution containing trivalent chromium having a pH ranging from about 3.7 to 4.0 for treating metal coated substrates at about room temperature wherein said solution contains substantially no hexavalent chromium.

These and other objects of the invention will become apparent by reference to the detailed description when considered in conjunction with the accompanying drawings.

DETAILED DESCRIPTION OF THE INVENTION

Figure 1:
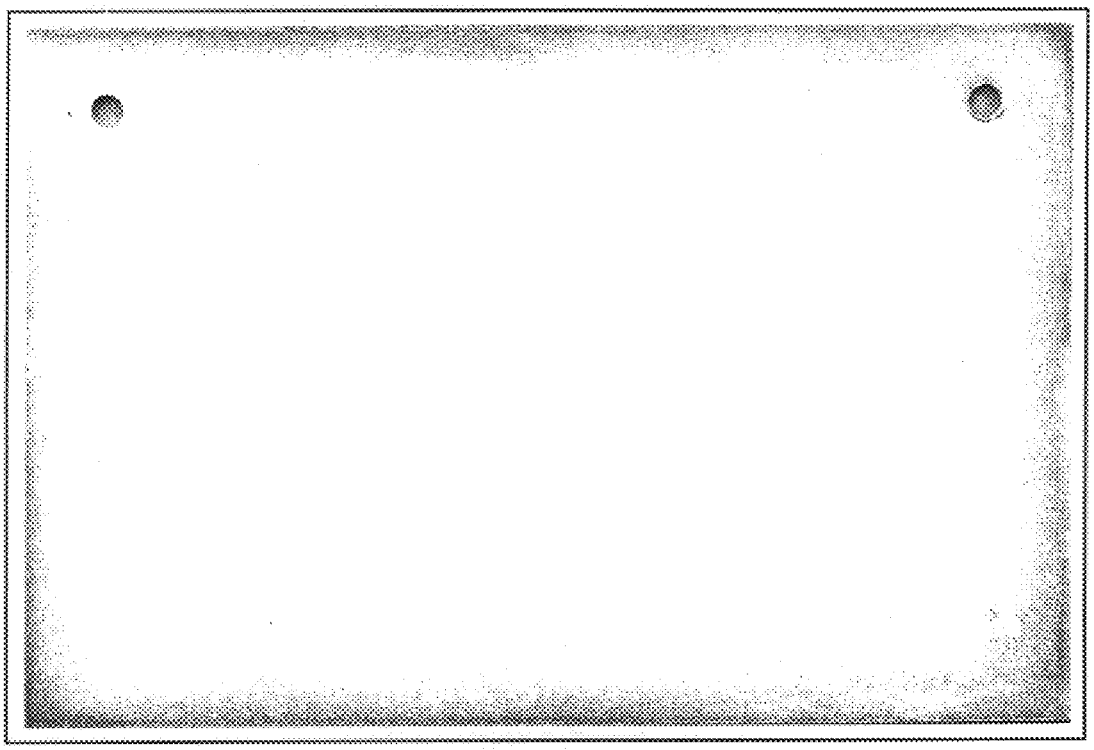
FIG. 1 photo shows TCP post-treatment of cadmium plated steel.

The invention is directed to a composition and to the process of post-treating metal coated substrates such as coatings of cadmium, zinc and zinc alloys such as tin-zinc and zinc-nickel, aluminum and aluminum alloys such as aluminum-manganese, copper, silver and other metals and their alloys that require a post treatment to enhanced corrosion protection, paint adhesion, or tarnish resistance.

More specifically, this invention relates an acidic aqueous solution having a pH ranging from about 2.5 to 4.5, and preferably from about 3.7 to 4.0 and to the use of said solution for post-treating metal coated substrates to improve the adhesive bonding, abrasion, and corrosion-resistance properties of the metal coatings. The compositions of this invention comprise, per liter of solution, from about 0.01 to 22 grams and preferably from about 4.0 to 8.0 grams e.g. 6.0 grams of at least one water soluble trivalent chromium salt e.g. chromium sulfate, about 0.01 to 12 grams and preferably about 6 to 10 grams e.g. 8.0 grams of at least one alkali metal hexafluorozirconate, about 0.01 to 12 grams and preferably from about 0.12 to 1.2 grams e.g. 0.24 to 0.36 grams of at least one alkali metal tetrafluoroborate and/or an alkali metal hexafluorosilicate and mixtures thereof at various ratio.

In some processes, depending on the physical character of the metal coated substrate, the addition of a water soluble thickener to the solution aids in optimum film formation during spray and wipe-on applications by slowing down solution evaporation. This also mitigates the formation of powdery deposits that degrade paint adhesion. In addition, the use of thickeners aid in proper film formation during large area applications and mitigates the diluent effect of rinse water remaining on the substrate during processing from previous steps. This feature yields films that have no streaks and are better in coloration and corrosion protection. A water-soluble thickener such as cellulose are present in the acidic solution in amounts ranging from about 0 to 10 grams per liter and preferably 0 to 2.0 grams and more preferably from 0.5 to 1.5 e.g. about 1.0 gram per liter of the aqueous solution. Depending on the character of the coated substrate, an effective but small amount of at least one water-soluble surfactant can be added to the acidic solution in amounts ranging from about 0 to 10 grams per liter and preferably 0 to 2.0 grams and more preferably from 0.5 to 1.5 grams e.g. 1.0 gram per liter of the acidic solution. These surfactants are known in the art of aqueous solutions and are organic compounds selected from the group consisting of non-ionic, cationic and anionic surfactants.

The trivalent chromium may be added as a water-soluble trivalent chromium compound, preferably as a trivalent chromium salt. Although the resultant coating is rinsed with water, it is desirable to use chromium salts that provide anions not as corrosive as the chlorides. Preferably these anions are selected from the group consisting of nitrates, sulphate, phosphate and acetates. Specifically, in formulating the acidic aqueous solutions of this invention, the chromium salt is added conveniently to the solution in its water soluble form wherein the valence of the chromium is plus 3. Some preferred chromium compounds are added to the solution in the form of $Cr_2(SO_4)_3$, $(NH_4)Cr(SO_4)_2$ or $KCr(SO_4)_2$ and various mixtures of these compounds. The most preferred trivalent chromium concentration is within the range of about 4 to 8 grams or 6.0 grams per liter of the aqueous solution. It has been found that particularly good results are obtained when the trivalent chromium compound is present in solution in this preferred range. The preferred metal fluorozirconate addition to the solution ranges from about 6 to 10 grams or 8.0 grams per liter. The post treatment of the metal coating can be carried out at low temperatures including the temperature of the solution e.g. temperatures ranging up to about 200° F. or at ambient temperatures. Room temperature treatment is preferred in that this eliminates the necessity for heating equipment. The coating may be air dried by any of the methods known in the art, for example, oven drying, forced air drying, exposure to infrared lamps, etc.

The following Examples illustrate the aqueous solutions of this invention and the method of using the solutions in post treating metal coated substrates.

EXAMPLE 1

An acidic aqueous solution having a pH ranging from about 3.7 to 4.0 for post-treating coated metals to improve the corrosion-resistant and adhesion bonding properties comprising from about 6.0 grams of trivalent chromium sulfate per liter of solution, about 8.0 grams of potassium hexafluorozirconate per liter of solution, about 0.01 grams of potassium tetrafluoroborate, about 1.0 gram of a cellulose thickener per liter and about 1.0 gram of a water soluble nonionic surfactant per liter of solution.

EXAMPLE 2

An acidic aqueous solution having a pH ranging from 3.7 to 4.0 for post-treating coated metal to improve adhesion bonding and corrosion-resistant which comprises, per liter of solution, from about 0.01 to 22 grams of trivalent chromium sulfate, about 0.01 to 12 grams of potassium hexafluorozirconate, about 0.01 to 12 grams of potassium tetrafluoroborate and from about 0.5 to 1.5 grams of methylcellulose thickener.

EXAMPLE 3

An acidic aqueous solution having a pH ranging from 3.7 to 4.0 for post-treating coated metals to improve adhesion bonding and corrosion-resistant which comprises, per liter of solution, from about 4.0 to 8.0 grams of trivalent potassium-chromium sulfate $(KCr(SO4)_2)$, about 6 to 10 grams of potassium hexafluorozirconate about 0.01 to 12 grams of potassium hexafluorosilicate and from about 0.5 to 1.5 grams of methylcellulose thickener.

EXAMPLE 4

A preferred method of preparing the acidic solution comprises mixing about 0.01 to 22 grams per liter of basic chromium III sulfate and preferably about 6.0 grams per liter with about 0.01 to 12 grams per liter of potassium hexafluorozirconate, preferably 8.0 grams per liter in distilled or deionized water. The solution is ready to use after a dwell period of 24 hours, and preferably after the pH of the solution has risen between 3.7 and 4.0. About 0.1 weight percent of Methocel F4M, or 1.0 gram per liter is added for optimum performance. Potassium tetrafluoroborate and/or potassium hexafluorosilicate is added in amounts ranging from 0.01 grams per liter up to their solubility limit. Preferably, about 50% weight percent of the fluorosilicate is added based on the weight of the fluorozirconate. About 1.0 to 10 weight percent of the fluoroborate salt is added to the solution based on the weight of the flurozirconate salt. More preferably, about 3.0 weight percent of the potassium tetrafluoroborate, based on the weight of the fluorozirconate is added to the solution The above examples may be stabilized by the manipulation of this pH. For example, to a freshly made solution of 8 grams per liter of potassium hexafluorozirconate and 6 grams per liter of chromium III sulfate dilute sulfuric acid is added to lower the pH to about 3.0. After about 1 week, the pH rises to about 3.6 where it stabilized without her chemical manipulation.

EXAMPLE 5

A post-treatment was applied to metal coated substrates as follows:

Mix 0.01 to 22 grams per liter chromium III sulfate basic (or up to solubility limit), preferably 6.0 grams per liter with 0.01 to 12 grams per liter of potassium hexafluorozirconate (or up to solubility limit), preferably 8.0 grams per liter in distilled or deionized water. The composition is ready to use after a dwell of 24 hours, most preferably after the pH of the solution has risen to about 3.7 to 4.0.

EXAMPLE 6

To Example 5, add 0.01 to 30% by weight of the solution of thickener and/or a surfactant to aid in spraying or wiping solution. Preferably, add 0.1 weight percent Methocel F4M, or 1.0 gram per liter for optimum performance.

EXAMPLE 7

To Example 6, potassium tetrafluoroborate and/or potassium hexafluorosilicate was added in an amount ranging from 0.01 grams per liter up to their solubility limits. Preferably, add about 50% weight percent of the fluorosilicate to Example 6 based on the weight of the fluorozirconate. An alternative is the addition of about 0.01 to 100 weight percent of the fluoroborate salt based on the weight of the fluorozirconate salt. Preferably, 1 to 10 weight percent of the fluoroborate salt based on the weight of the fluorozirconate salt is added to the solution. More preferably, about 3.0 weight percent of the potassium tetrafluoroborate based on the weight of the fluorozirconate salt is added to the solution. A preferred solution comprises 8 grams per liter of potassium hexafluorozirconate, 6 grams per liter of chromium III sulfate basic, and 0.24 grams per liter of potassium tetrafluoroborate. This preferred ratio of the tetrafluoroborate to hexafluorozirconate holds for all concentrations of the hexafluorozirconate.

EXAMPLE 8

A post treatment was applied to a cadmium coat metal as follows. Immediately after plating a 4" by 6" by 0.040" piece of AISI 4130 steel with 0.5 mils (0.0005 inches) of cadmium metal using standard electroplating methods, the panel was rinsed thoroughly two times in deionized water. Immediately after rinsing, the panel was immersed into a solution of Example 7 for 5 minutes at ambient conditions. The 5-minute immersion was immediately followed by two deionized water rinses. The panel was air-dried at ambient conditions before being scribed through the cadmium coating to the steel substrate and subjected to 1000 hours of neutral salt fog per ASTM B 117. The coupon was held in a rack at 15 degrees for the duration of the test. This was tested alongside a "control" that consisted of a similarly-plated cadmium coating on 4130 steel that was post treated by immersing in a 5% solution of potassium dichromate for 2 minutes.

Figure 2:
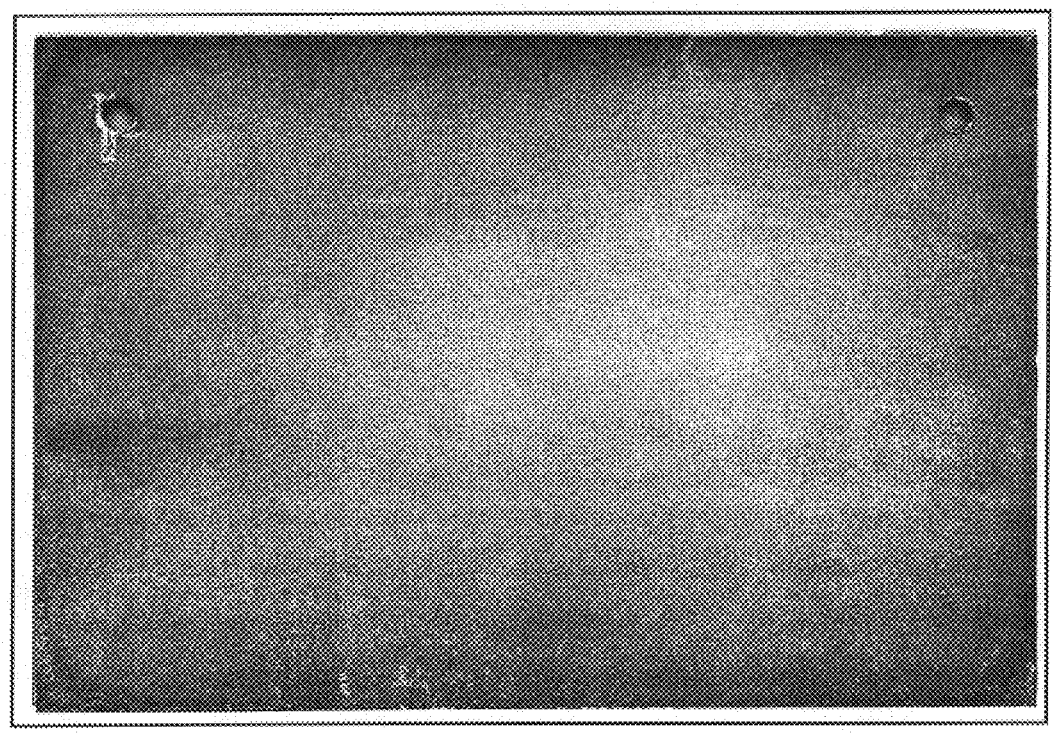
FIG. 2 photo shows chromate post-treatment of cadmium plated steel.
Figure 3:
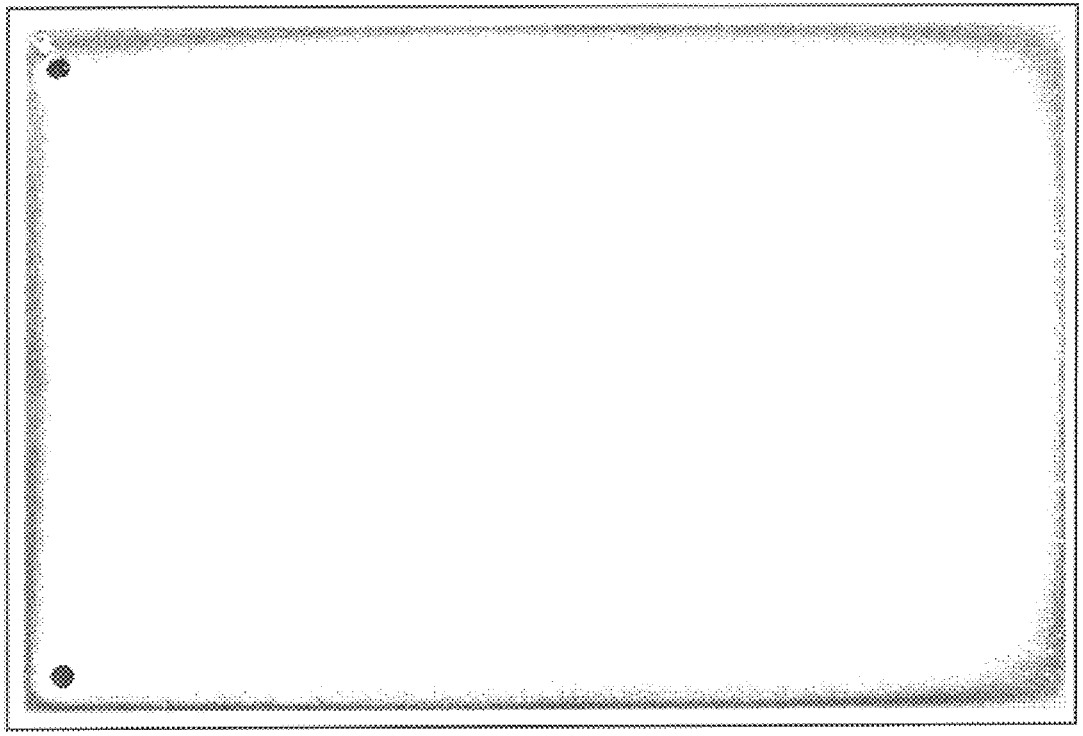
FIG. 3 photo shows cadmium plated steel without TCP post-treatment.
Figure 4:
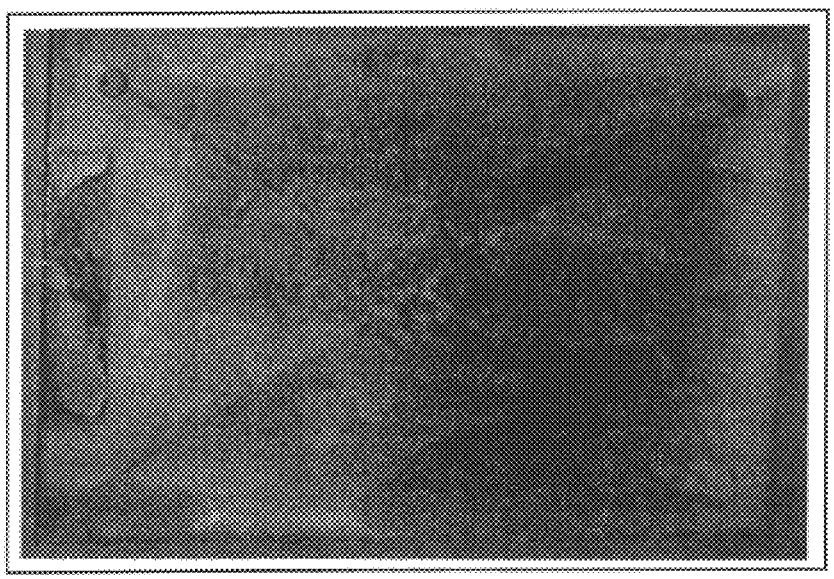
FIG. 4 photo shows cadmium plated steel with TCP post-treatment.
Figure 5:
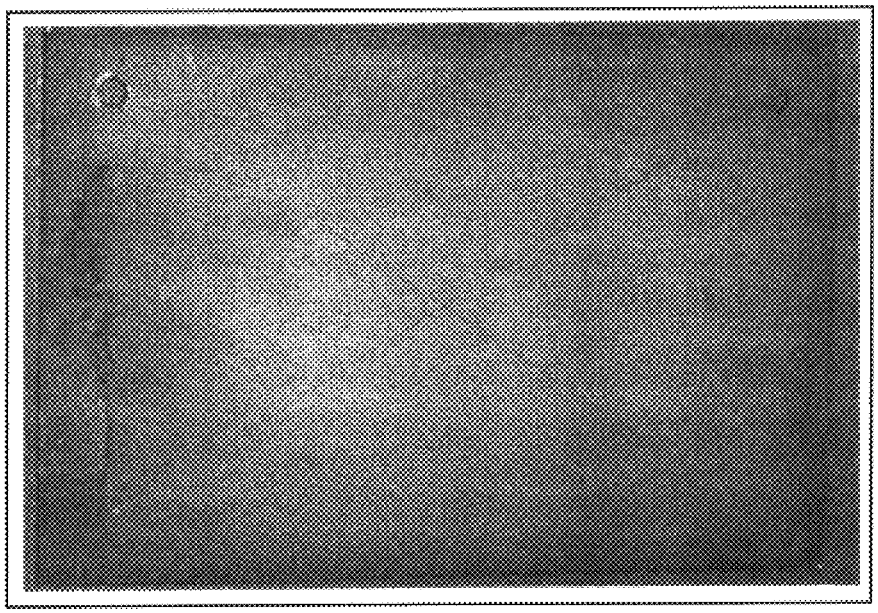
FIG. 5 photo shows cadmium plated steel with chromate post-treatment.
Figure 6:
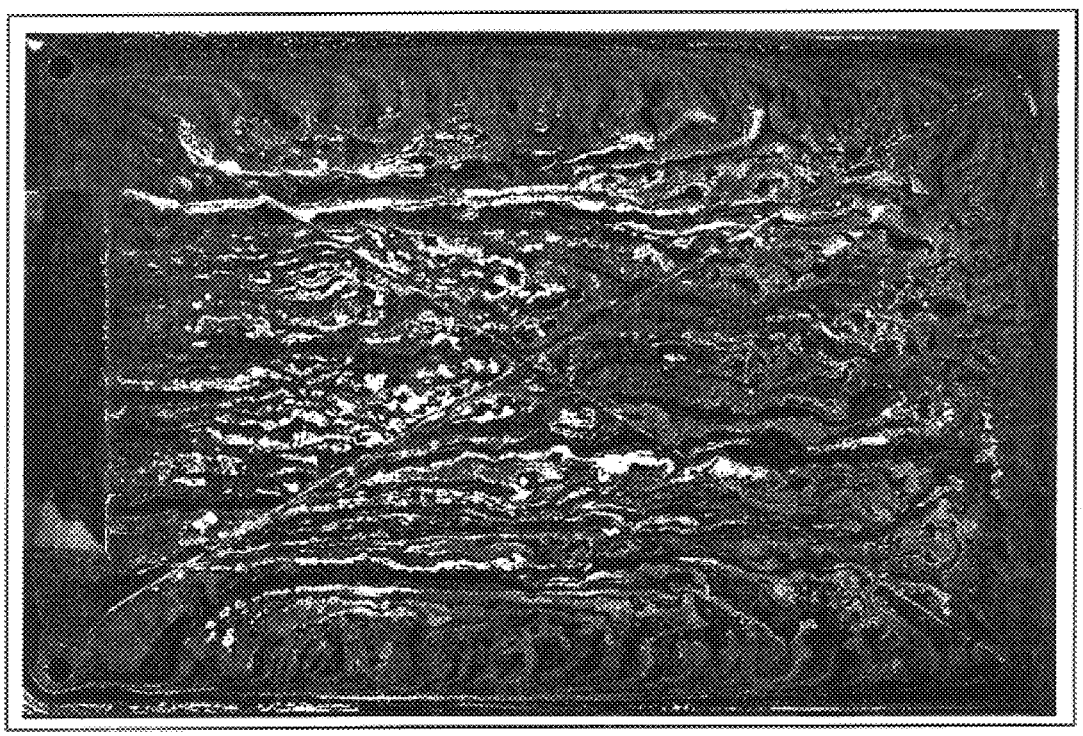
FIG. 6 shows cadmium plated steel without post-treatment.
Figure 7:
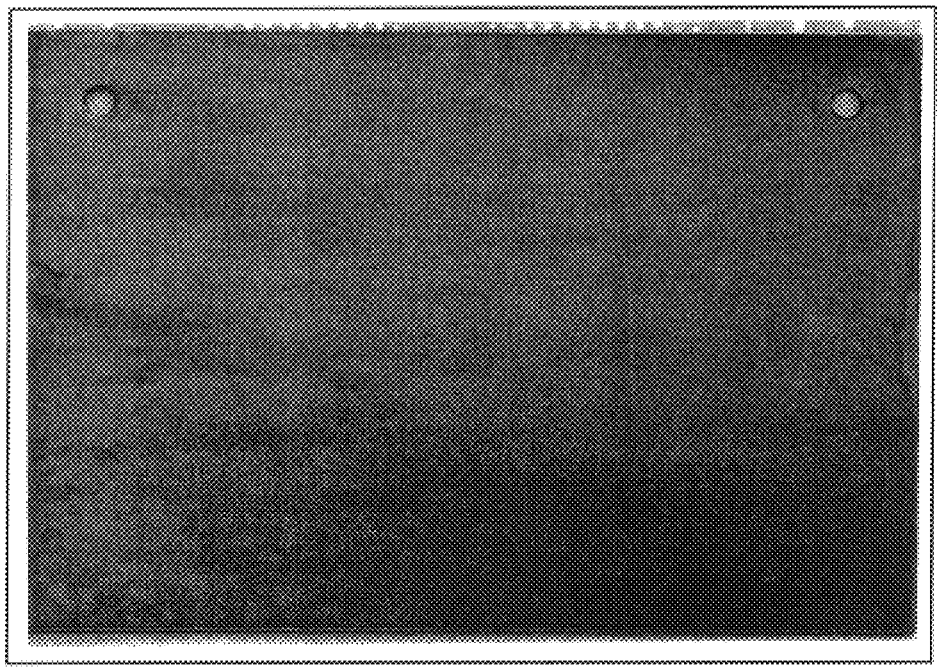
FIG. 7 photo shows basic zinc-nickel plated steel with TCP post-treatment.
Figure 8:
FIG. 8 photo shows acid zinc-nickel plated steel with TCP post-treatment.
Figure 9:
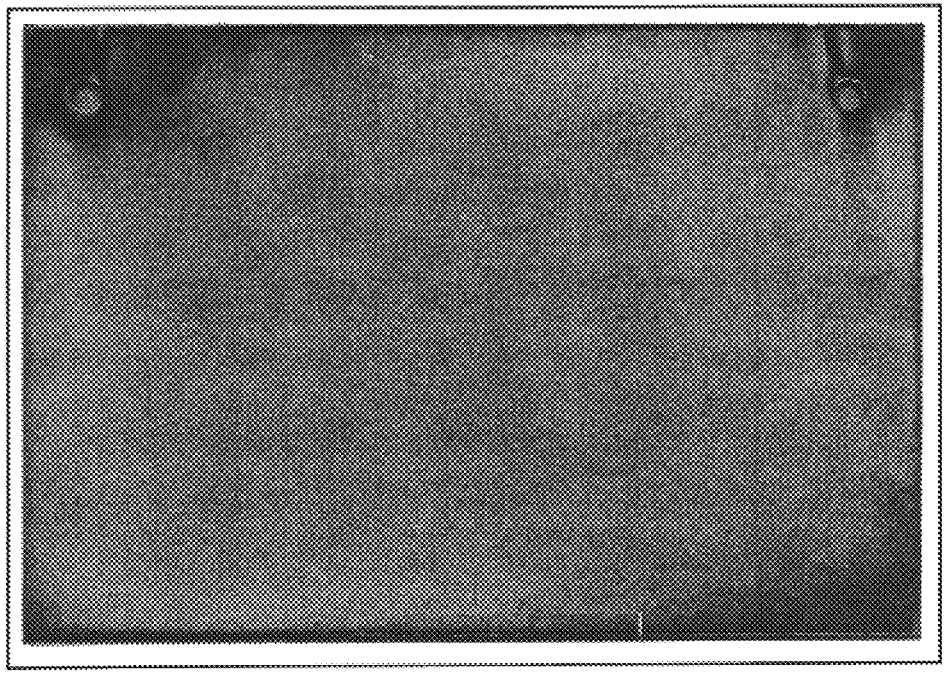
FIG. 9 photo shows basic zinc-nickel plated steel with chromate post-treatment.
Figure 10:
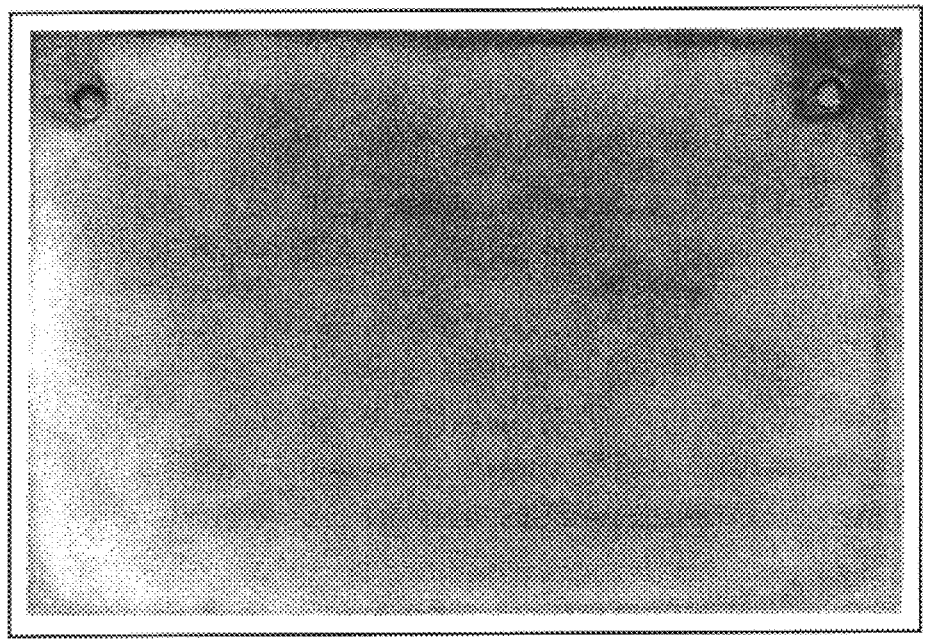
FIG. 10 photo shows acid zinc-nickel plated steel with chromate post-treatment.
Figure 11:
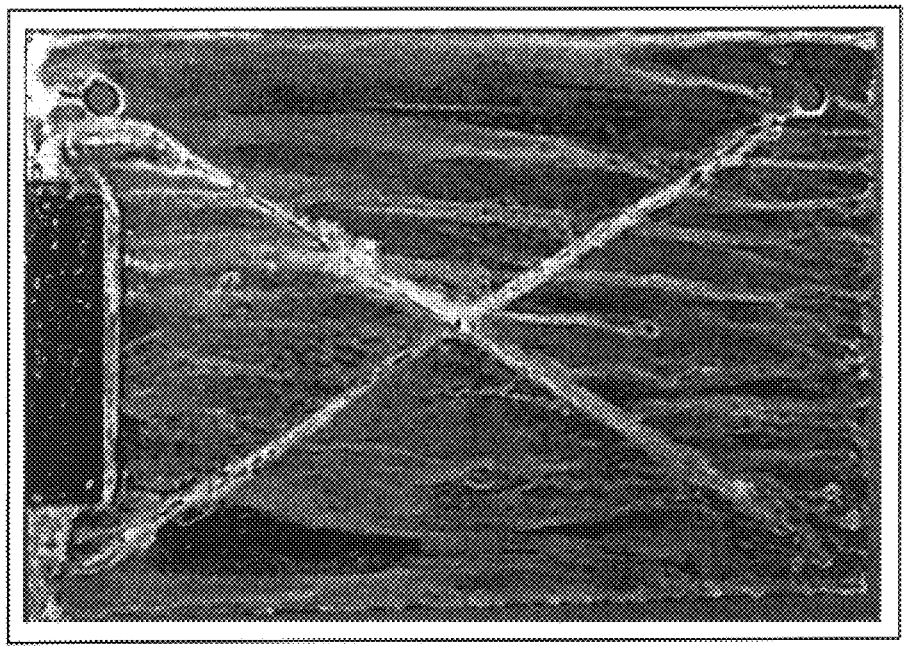
FIG. 11 photo shows basic zinc-nickel plated steel with TCP post-treatment.
Figure 12:
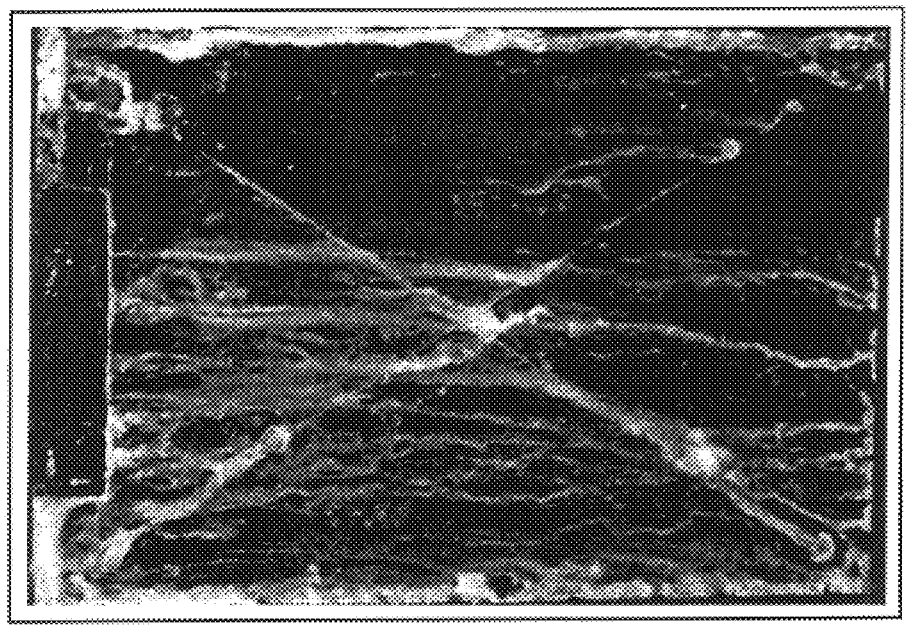
FIG. 12 photo shows acid zinc-nickel plated steel with TCP post-treatment.
Figure 13:
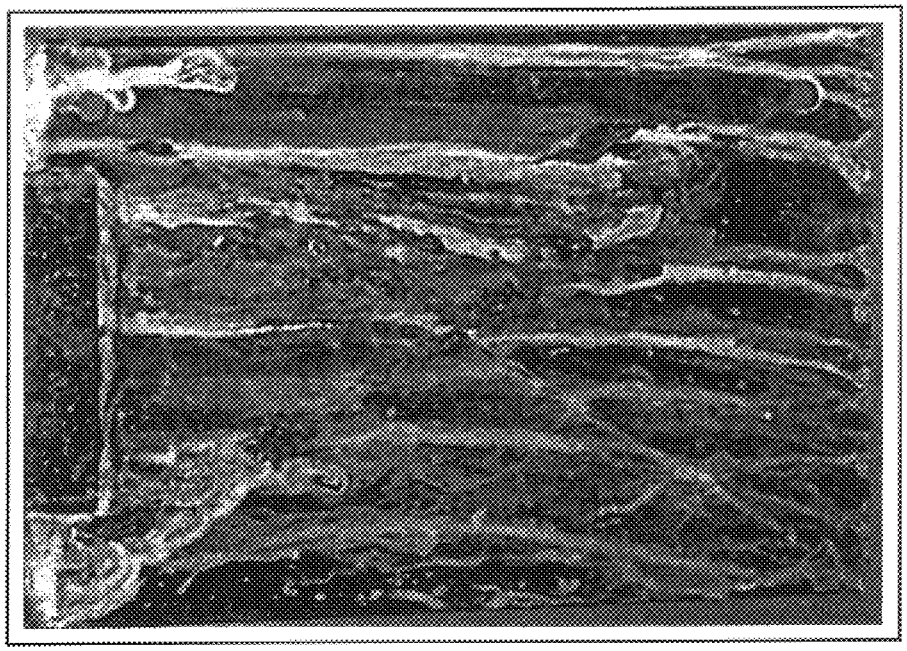
FIG. 13 photo shows basic zinc-nickel plated steel with chromate post-treatment.
Figure 14:
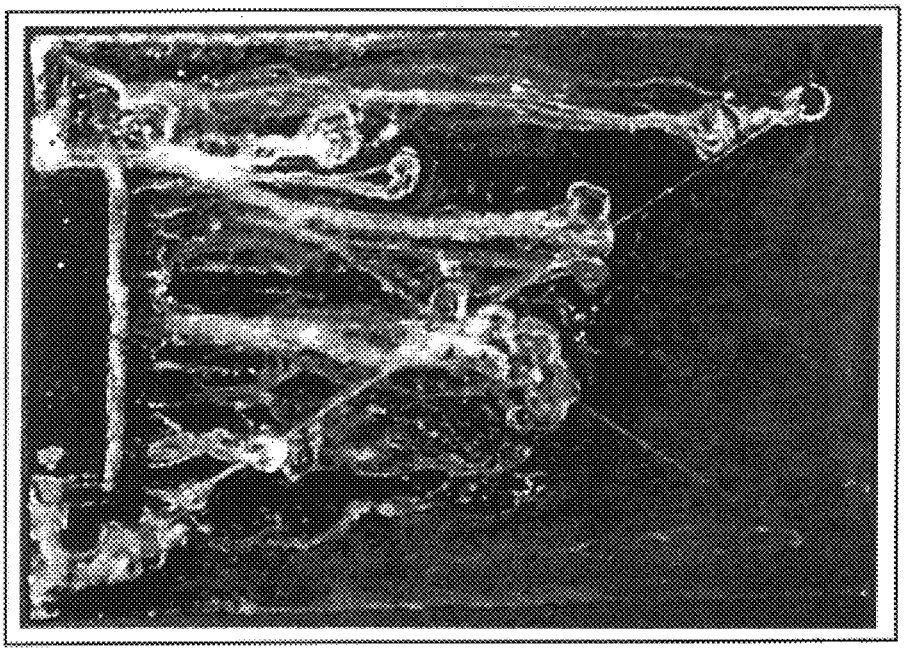
FIG. 14 photo shows acid zinc-nickel plated steel with chromate post-treatment.
Figure 15:
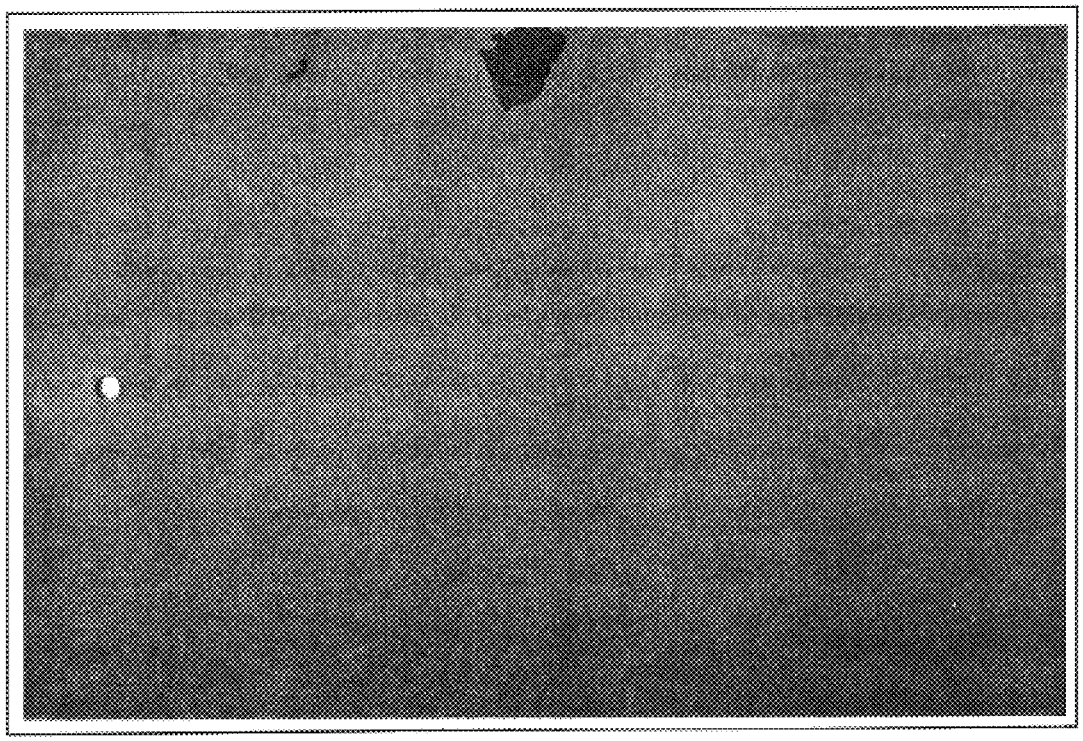
FIG. 15 photo shows zinc-nickel coating with no post-treatment.
Figure 16:
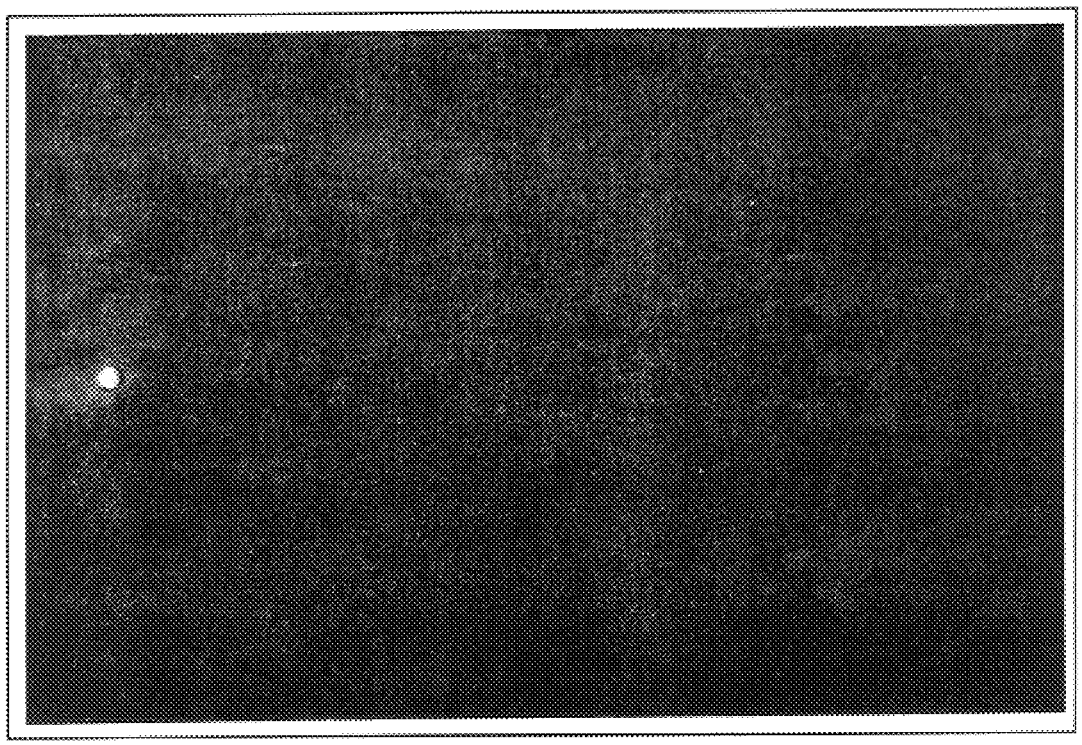
FIG. 16 photo shows zinc-nickel coating with TCP post-treatment.
Figure 17:
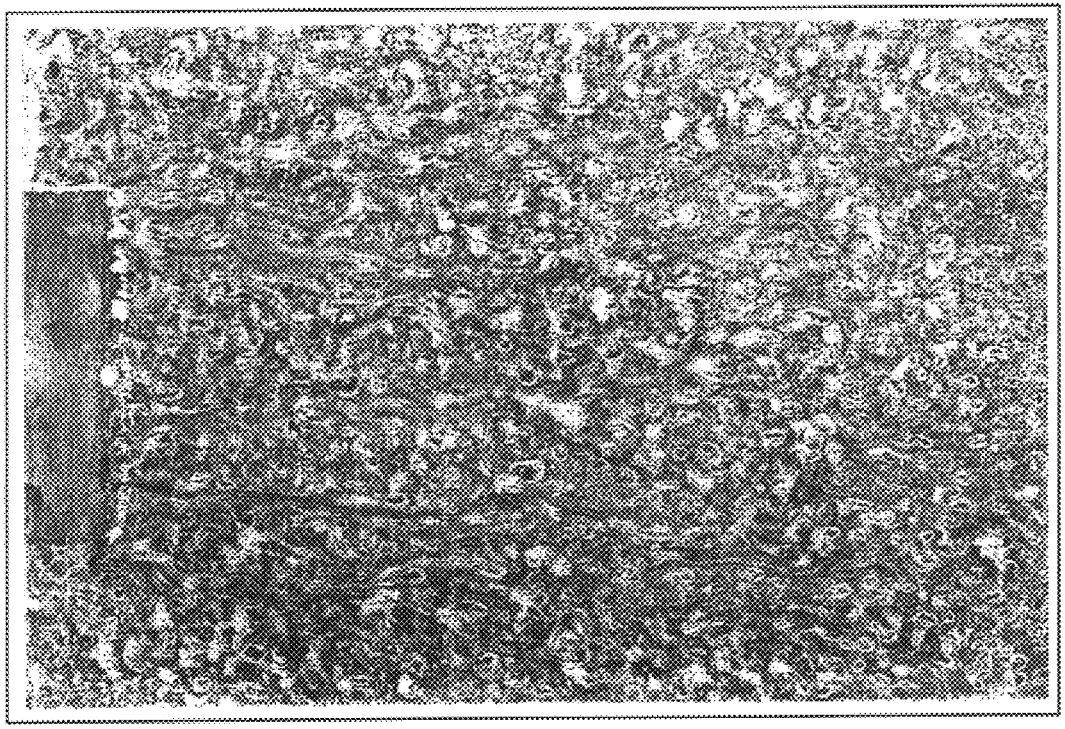
FIG. 17 photo shows zinc-nickel coating with no post-treatment after 24 hours in ASTM B117 neutral salt fog.
Figure 18:
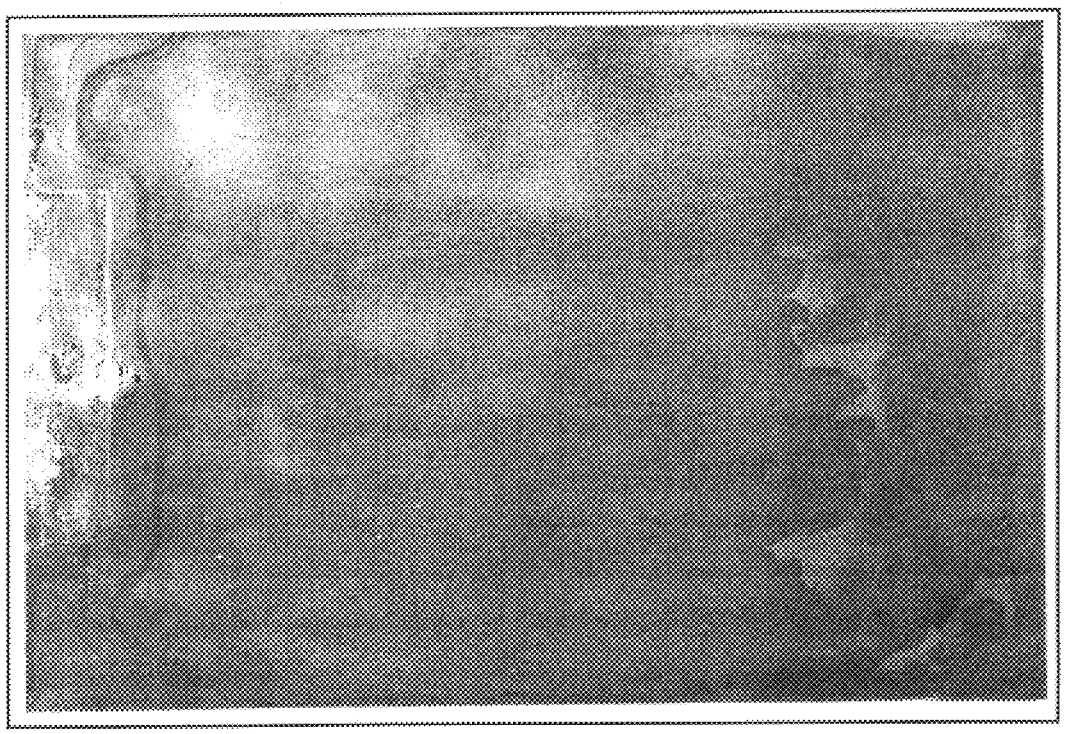
FIG. 18 photo shows zinc-nickel coating with TCP post-treatment after 24 hours in ASTM B117 neutral salt fog.

FIGS. 1 and 2 (Photos 1 and 2) show the post treatment and chromate control on cadmium-plated steel as made. FIG. 3 (Photo 3) shows a cadmium coating without a post treatment. FIGS. 4 and 5 (Photos 4 and 5) show the same panels after the 1000-hour exposure to the neutral salt fog. FIG. 6 (Photo 6) shows the cadmium coating without a post treatment after only 72 hours. As shown in the photos, the post treatment provides significant corrosion protection to the cadmium coating and is more or less equivalent to the chromate post treatment control.

EXAMPLE 9

Post treatment coatings were applied to two types of zinc-nickel alloy plating as follows. Zinc-nickel alloys are potential alternatives to cadmium and have similar corrosion and other requirements. The first type of zinc-nickel, called "basic" zinc-nickel, as plated by standard industry methods from a composition sold by Dipsol-Gumm. The second type of zinc-nickel, called "acid" zinc-nickel, was plated by the Boeing Company using a proprietary composition. Each coating is different due to variations in zinc content, brightness, density and performance in qualifying tests as an alternative to cadmium. As a result each is treated as a separate competitor although they are related alloys.

One panel each of the basic- and acid-zinc-nickel was immersed for 5 minutes in a solution of Example 7 at ambient conditions. Two deionized water rinses were completed after the 5-minute immersion. The panels were air-dried at ambient conditions before being scribed through the zinc-nickel coating to the steel substrate and subjected to 1000 hours of neutral salt fog per ASTM B 117. The coupons were held in a rack at 15 degrees for the duration of the test. This was tested alongside a "control" that consisted of similarly-plated zinc-nickel coatings on 4130 steel that were post treated by immersing in a 5% solution of potassium dichromate for 2 minutes.

FIGS. 7, 8, 9 and 10 (Photos 7, 8, 9 and 10) show the post treatment and chromate control on basic- and acid zinc-nickel as made. FIGS. 11–14 (Photos 11 to 14) show the same panels after the 1000-hour exposure to the neutral salt fog As shown by the photos, the post treatment provides significant corrosion protection to the zinc-nickel coatings and is more or less equivalent to the chromate post treatment controls. Zinc-nickel coatings without post treatments will show red corrosion products after about 72 hours, similar to cadmium. The post treatment (TCP), as well as the chromate control, provides a substantial boost in corrosion resistance compared to none.

EXAMPLE 10

Post treatment coatings were applied to "basic" zinc-nickel, which was plated by standard industry methods from a composition sold by Dipsol-Gumm. One panel with a 0.005" (0.5 mil) thick basic-zinc-nickel electroplated coating was immersed for 5 minutes in a solution of Example 7 at ambient conditions. A second panel was plated but not post treated. Two deionized water rinses were completed after the 5-minute immersion. The panels were air-dried at ambient and subjected to 24 hours of neutral salt fog per ASTM B 117. The coupons were held in a rack at 15° for the duration of the test. FIGS. 15–18 (photos 15, 16, 17, and 18) show the post-treatment and control before and after exposure to the salt fog. As seen, the post-treatment (TCP) provides significant corrosion protection to the zinc-nickel coating.

For purposes of this invention, the water soluble surfactants are added to the chromate solution in amounts ranging from about 0 to 10 grams per liter and preferably 0.0 to about 2.0 grams per liter and more preferably from about 0.5 to 1.5 grams per liter of the trivalent chromium solution. The surfactants are added to the aqueous (TCP) solution to provide better wetting properties by lowering the surface tension thereby insuring complete coverage, and a more uniform film on the coated substrate. The surfactants include at least one water soluble compound selected from the group consisting of the non-ionic, anionic, and cationic surfactants. Some of the preferred water soluble surfactants include the monocarboxyl imidoazoline, alkyl sulfate sodium salts (DUPONOL®), tridecyloxy poly(alkyleneoxy ethanol), ethoxylated or propoxylated alkyl phenol (IGEPAL®), alkyl sulfoamides, alkaryl sulfonates, palmitic alkanol amides (CENTROL®), octylphenyl polyethoxy ethanol (TRITON®), sorbitan monopalmitate (SPAN®), dodecylphenyl polyethylene glycol ether (e.g. TERGITROL®), alkyl pyrrolidone, polyalkoxylated fatty acid esters, alkylbenzene sulfonates and mixtures thereof Other known water soluble surfactants are disclosed by "Surfactants and Detersive Systems", published by John Wiley & Sons in Kirk-Othmer's Encyclopedia of Chemical Technology, $3^{rd}$ Ed.

When large surfaces do not permit immersion or where vertical surfaces are to be sprayed, thickening agents are added also to retain the aqueous (TCP) solution on the surface for sufficient contact time. The thickeners employed are known inorganic and organic water soluble thickeners which can be added to the trivalent chromium solutions in effective amounts ranging from about 0 to 10 grams per liter and preferably 0.0 and about 2.0 grams per liter and more preferably from about 0.5 to 1.5 grams per liter of the acidic solution. Specific examples of the preferred thickeners include the cellulose compounds, e.g. hydroxypropyl cellulose (e.g. Klucel), ethyl cellulose, hydroxyethyl cellulose, hydroxymethyl cellulose, and methyl cellulose. Some of the water soluble inorganic thickeners include colloidal silica, clays such as bentonite, starches, gum arabic, tragacanth, ago and various combination thereof While this invention has been described by a number of specific examples, it is obvious that there are other variations and modifications which can be made without departing from the spirit and scope of the invention as particularly set forth in the appended claims.

The invention claimed:

1. A process for post-treating metal coated substrates to improve the corrosion-resistance, abrasion, and adhesion bonding properties which comprises treating the metal coated substrates with an acidic aqueous solution having a pH ranging from about 2.5 to 4.5 comprising, per liter of said solution, from about 0.01 to 22 grams of a water soluble trivalent chromium salt, about 0.01 to 12 grams of an alkali metal hexafluorozirconate, about 0.01 to 12 grams of a least one fluoro-compound selected from the group consisting of alkali metal tetrafluoroborates, alkali metal hexafluorosilicate and mixtures thereof, from 0 to 10 grams of at least one water soluble thickener and 0 to 10 grams of at least one water soluble surfactant.

2. The process of claim 1 wherein the pH of the aqueous solution ranges from about 3.7 to 4.0 and the temperature of the solution is about room temperature.

3. The process of claim 2 wherein the trivalent chromium salt ranges from about 4 to 8 grams, the hexafluorozirconate ranges from about 6 to 10 grams, and the tetrafluoroborate ranges from about 0.12 to 1.2 grams.

4. The process of claim 3 wherein the thickener is a cellulose compound ranging from about 0.5 to 1.5 grams.

5. The process of claim 4 wherein the surfactant is a nonionic surfactant ranging from about 0.5 to 1.5 grams.

6. A process for post-treating metal coated substrates to improve the corrosion-resistance, abrasion, and adhesion bonding properties which comprises treating the metal coated substrates with an aqueous solution having a pH ranging from about 3.7 to 4.0 which comprises, per liter of solution, from about 4.0 to 8.0 grams of a water soluble trivalent chromium salt, about 6.0 to 10 grams of an alkali metal hexafluorozirconate, and about 0.12 to 1.2 grams of at least one fluoro-compound selected from the group consisting of tetrafluoroborate, hexafluorosilicate and mixtures thereof.

7. The process of claim 6 wherein the tetrafloroborate is present in the solution in an amount ranging from about 0.24 to 0.36 grams and the post-treated metal coated substrate is subsequently treated with hot water at temperatures ranging up to about 200° F.

8. The process of claim 6 wherein about 0.5 to 1.5 grams of a cellulose thickener is added to the acidic solution.

9. The process of claim 6 wherein the chromium salt is trivalent chromium sulfate.

10. The process of claim 6 wherein the alkali metal zirconate is potassium hexafluorozirconate.

11. The process of claim 6 wherein the metal coated substrate is a cadmium-plated steel.

12. The process of claim 6 wherein the metal coated substrate is a zinc-nickel alloy coated substrate.

13. A composition for post-treating metal coated substrates to improve the corrosion-resistance, abrasion, and adhesion bonding properties which comprises an acidic aqueous solution having a pH ranging from about 2.5 to 4.5, and containing per liter of said solution, from about 0.01 to 22 grams of a water-soluble trivalent chromium salt, about 0.01 to 12 grams of an alkali metal hexafluorozirconate, about 0.01 to 12 grams of at least one fluoro-compound selected from the group consisting of an alkali metal tetrafluoroborate, an alkali metal hexafluorosilicate and mixtures thereof, from 0 to 10 grams of at least one water soluble thickener and from 0 to 10 grams of at least one water soluble surfactant.

14. The composition of claim 13 wherein the pH of the aqueous solution ranges from about 3.7 to 4.0.

15. The composition of claim 14 wherein the trivalent chromium salt ranges from about 4.0 to 8.0 grams, the hexafluorozirconate ranges from about 6.0 to 10 grams, and the tetrafluoroborate ranges from about 0.12 to 1.2 grams.

16. The composition of claim 15 wherein the thickener ranges from about 0.5 to 1.5 grams.

17. The composition of claim 16 wherein the surfactant ranges from about 0.5 to 1.5 grams.

18. A composition for post-treating metal coated substrates to improve the corrosion-resistance, abrasion, and adhesion bonding properties which consists essentially of an acidic aqueous solution having a pH ranging from about 3.7 to 4.0, and containing per liter of said solution, from about 4.0 to 8 grams of a water soluble trivalent chromium salt, about 6.0 to 10 grams of an alkali metal hexafluorozirconate, about 0.01 to 12 grams of at least one fluoro-compound selected from the group consisting of tetrafluoroborate, hexafluorosilicate and mixtures thereof, from 0 to 2.0 grams of at least one water soluble thickener and from 0 to 2.0 grams of a least one water soluble surfactant.

19. The composition of claim 18 wherein the tetrafluoroborate is present in the solution in an amount ranging from about 0.24 to 0.36 grams.

20. The composition of claim 19 wherein about 0.5 to 1.5 grams of a cellulose thickener is added to the solution.

21. The composition of claim 20 wherein the chromium salt is trivalent chromium sulfate.

22. The composition of claim 21 wherein the alkali metal zirconate is potassium hexafluorozirconate.

* * * * *